United States Patent
Kaestle et al.

(10) Patent No.: US 9,667,188 B2
(45) Date of Patent: May 30, 2017

(54) FLOW CONTROL ACTUATOR

(75) Inventors: Ralf Kaestle, Zurich (CH); Harald Bergmann, Hombrechtikon (CH); Patrick Thuer, Wetzikon (CH)

(73) Assignee: BELIMO HOLDING AG, Hinwil (CH)

( * ) Notice: Subject to any disclaimer, the term of this patent is extended or adjusted under 35 U.S.C. 154(b) by 1446 days.

(21) Appl. No.: 13/079,970

(22) Filed: Apr. 5, 2011

(65) Prior Publication Data
US 2012/0256108 A1    Oct. 11, 2012

(51) Int. Cl.
| | |
|---|---|
| G05B 5/00 | (2006.01) |
| H02P 7/08 | (2006.01) |
| F16K 31/02 | (2006.01) |
| H02P 1/04 | (2006.01) |
| H02P 25/24 | (2006.01) |
| F16K 31/04 | (2006.01) |
| H02P 29/60 | (2016.01) |
| A62C 2/24 | (2006.01) |

(52) U.S. Cl.
CPC ............ *H02P 25/24* (2013.01); *F16K 31/042* (2013.01); *H02P 29/60* (2016.02); *A62C 2/247* (2013.01)

(58) Field of Classification Search
CPC .......... F16K 31/02; G05B 5/00; G05D 23/00; H02P 1/04; H02P 3/00; H02P 7/00
USPC ............... 318/445, 471; 251/129.01
See application file for complete search history.

(56) References Cited

U.S. PATENT DOCUMENTS

| | | | |
|---|---|---|---|
| 3,625,476 A | | 12/1971 | Meier |
| 4,061,949 A | * | 12/1977 | Griffis ............................ 318/154 |
| 4,882,530 A | | 11/1989 | Kabune et al. |
| 4,926,077 A | | 5/1990 | Gauthier et al. |
| 6,249,100 B1 | | 6/2001 | Lange |
| 2001/0055947 A1 | | 12/2001 | McCabe |
| 2002/0109473 A1 | * | 8/2002 | Romanowich et al. ...... 318/434 |
| 2005/0064811 A1 | | 3/2005 | Mrozek et al. |
| 2005/0127861 A1 | * | 6/2005 | McMillan et al. ............ 318/268 |
| 2007/0205732 A1 | * | 9/2007 | Beifus ............................ 318/432 |

(Continued)

FOREIGN PATENT DOCUMENTS

| | | |
|---|---|---|
| EP | 0895346 A2 | 2/1999 |
| RU | 2 367 833 C1 | 9/2009 |
| WO | 2007/064310 A1 | 6/2007 |

OTHER PUBLICATIONS

PCT International Search Report.
EP Application No. 12 714 928.4 Office Action dated Aug. 21, 2014.

*Primary Examiner* — Kawing Chan
(74) *Attorney, Agent, or Firm* — Thaddius J. Carvis

(57) ABSTRACT

An actuator (1') for driving a regulating element (30) for controlling a fluid flow in a flow channel (29) includes an electric motor (4) for driving the regulating element (30) and a control unit (2) for controlling a current provided to the electric motor (4). A resistive element (3) including a resistor (5) and a NTC thermistor (6) connected in parallel across the resistor (5) is positioned in a current path from the control unit (2) to the motor (4). Accordingly, when the ambient temperature increases, the decreasing resistance of the resistive element (3) counterbalances the increasing resistance of the motor windings, resulting in a less varying current from the control unit (2) to the motor (4) and therewith in a less varying output torque of the motor (4).

24 Claims, 1 Drawing Sheet

(56) References Cited

U.S. PATENT DOCUMENTS

2008/0084173 A1\* 4/2008 Grabinger et al. ........... 318/432
2010/0123421 A1 5/2010 Grabinger et al.

\* cited by examiner

FLOW CONTROL ACTUATOR

TECHNICAL FIELD

The invention relates to an actuator for driving a regulating element for controlling a fluid flow in a flow channel, the actuator including an electric motor for driving the regulating element and a control unit for controlling a current provided to the electric motor, where a resistive element is positioned in a current path from the control unit to the electric motor.

BACKGROUND ART

HVAC systems and components, i.e. systems and components in the field of heating, ventilation and air conditioning exist in many different designs. One of them are systems and components which are designed to nominally work in a given temperature range but are also equipped with specific features which allow them to work in exceptional situations under substantially different temperature conditions too, at least for a certain period of time. Such exceptional situations include for example fire and smoke situations.

One of the tasks performed by some HVAC components is to regulate the flow of a fluid such as a water or air flow through a flow channel such as a tube, an air duct, a channel or the like. This is often accomplished with dampers or valves which are arranged in or near the flow channel and which are controllable to open or close the flow channel to a given extent.

Electric motors are often used to regulate the position of the damper or valve in order to achieve a desired rate of flow of the fluid in the flow channel. A disadvantage of electric motors is however that the outpour power of the motor decreases with an increasing temperature. One of the reasons for this decrease is the fact that the current source is not ideal. Another reason is that the magnetic field in an electric motor decreases because the magnet becomes weaker. Accordingly, in the case of an increased ambient temperature the motor torque decreases which may result in a malfunction of the entire system since the decreased motor torque does no longer suffice to actuate the damper or valve.

In a known solution of this problem, the electric motors and therewith also the motor control and other units of the system are dimensioned to fulfill the torque requirement at the higher temperatures. Accordingly, the size of the motor has been chosen such that the reduced motor torque at the higher temperatures suffices to actuate the damper or valve. Or in other words, the motor as well as other components have been substantially oversized resulting in higher space requirements and increased costs not only for the motor but also for other system components.

Another HVAC actuator is disclosed in US 2010/0123421 A1 from Honeywell. The actuator includes a controller that controls the output torque of a motor in response to various sensor signals such as position or speed sensors.

Whereas such a digital torque control would generally be possible to control the torque in case of an increasing ambient temperature, it shows increased part and space and therewith also cost requirements, since additional components such as sensors or a complex motor controller are needed for its implementation.

EP 0 895 346 A2 also from Honeywell discloses a further HVAC actuator being a two-position spring return actuator and that is able to properly work at an elevated temperature. The actuator includes a temperature sensor and a PWM (pulse width modulation) controller that controls the voltage at which current is supplied to the motor. In particular, the controller controls the voltage at which current is supplied to the motor in dependency of the sensed temperature. In order to compensate the decrease of the motor power in case of an elevated temperature, the controller increases the voltage if the sensed temperature exceeds a given limit.

This actuator too requires a complex and therefore expensive control and does not allow for a continuous temperature dependent voltage control but only two temperature input values, either below or above a given limit.

SUMMARY OF THE INVENTION

It is an object of the invention to provide an actuator pertaining to the technical field initially mentioned which can be operated in a large temperature range but having reduced part, space and cost requirements. It is a further object of the invention to provide a control unit for such an actuator. It is a further object of the invention to provide a process for accordingly driving a regulating element for controlling a fluid flow in a flow channel The solution of the above object of the invention is specified by the features of claim 1. An actuator for driving a regulating element for controlling a fluid flow in a flow channel includes an electric motor for driving the regulating element and a control unit for controlling a current provided to the electric motor, where a resistive element is positioned in a current path from the control unit to the electric motor. According to the invention, the resistance of the resistive element has a non-linear temperature dependency.

The output torque of the electric motor mainly is a function of the current through the motor windings. In response to a varying temperature, the resistive device has, due to its temperature dependent resistance and depending on its temperature coefficient—an increased or decreased resistance. Accordingly, a change of the ambient temperature has two opposing effects. An increasing temperature for example firstly results in a decreasing current in the motor windings. And in the case of a negative temperature coefficient of the resistive element it secondly results in a decreasing resistance of the resistive element and therewith in a current rise in the motor windings. The current rise through the resistive element therefore counterbalances the current drop in the motor. Both effects together result in a motor current that—depending on the choice and the characteristic curve of the resistive element—is less varying or substantially constant.

In another example a decreasing temperature results in a current rise in the motor windings. In the case of a positive temperature coefficient of the resistive element its resistance is increased which reduces the current in the motor windings. Again, the increasing resistance of the resistive element counterbalances the current rise in the motor, again resulting in a less varying or substantially constant current.

Most often a resistive element with an ohmic resistance, that is a resistance with a substantially linear temperature dependency, is positioned in the current path from the control unit to the motor anyway. By a simple modification of this resistive element to a resistive element with a non-linear temperature dependent resistance the above mentioned object of the invention is achieved with a minimum of additional space and parts and therefore minimum additional costs.

In a preferred embodiment of the invention a resistive element with a resistance that has a substantially exponential temperature dependency is positioned in the current path from the control unit to the motor.

Depending on the particular application of the actuator resistive elements with a positive temperature coefficient may be used. In an application where the motor is for example exposed to temperatures substantially below their nominal operating temperature, a resistive element with a positive temperature coefficient may be used to limit the motor current to a maximum value or to keep it constant as mentioned above.

In a preferred embodiment of the invention the resistive element has however a negative temperature coefficient, such that a decreasing motor current due to an increasing ambient temperature can be counterbalanced.

There exist different ways to implement a resistive element with the desired temperature dependency. The resistive element could for example be obtained by a temperature sensor, at least one switch and several resistors connected in a resistance network, where each resistor has a linear temperature dependency. The non-linear temperature dependent resistance may then be obtained by sensing the temperature and activating and/or deactivating different subsets of resistors in dependency of the different sensed temperatures by switching the at least one switch on or off. A disadvantage of this implementation is an increased number of parts.

Another way is to directly position a single resistor with a negative temperature coefficient in the current path from the control unit to the motor. In certain applications it is however not possible to find a resistor having the desired resistance at the nominal operating temperature as well as at the higher temperatures.

In a preferred embodiment of the invention the resistive element therefore includes a first resistive element and a device with a negative temperature coefficient connected in parallel to the first resistive element. The first resistive element is usually the resistor that is anyway present in the current path from the control unit to the motor. Since the first resistive element and the device can be sized independently of each other this configuration allows to obtain the desired resistance values over the whole range of operating temperatures with only one single additional component.

It is further possible to refit or upgrade existing actuators by simply connecting such a device with a negative temperature coefficient across the existing resistor in the current path from the control unit to the motor.

The device with the negative temperature coefficient is preferably a thermistor, since different types of thermistors with a negative temperature coefficient, briefly designated as NTC thermistors, are easily available for reasonable costs. Such a NTC thermistor features a continuous characteristic of its resistance in dependency of the temperature which further enables a continuous temperature dependent control of the resistance and therewith the motor power.

Whereas such a NTC thermistor can, as in the example above for refitting or upgrading an existing actuator, be provided separately from the control unit, the control unit and the NTC thermistor are preferably part of a single electric circuit. The term single electric circuit in this connection means, that they are realised on a single, common substrate such as for example a single printed circuit board or a single integrated circuit. Thus the control circuit and the thermistor can be manufactured together which allows to reduce the number of manufacturing steps for the actuator.

Generally, not only the NTC device can be implemented by a thermistor, but also the first resistive element. However, due to its simplicity and since most existing actuator designs anyway include an ohmic resistor in the current path from the control unit to the electric motor, the first resistive element is preferably implemented as an ohmic resistor.

In certain applications it is not required that the motor current meets the nominal current over the whole temperature range. It may be sufficient to just reduce the current drop in a certain temperature range.

In other applications correct sizing of the NTC thermistor is however crucial. In a preferred embodiment of the invention, the NTC thermistor is therefore designed such that a drop of the motor current due to an increase of the ambient temperature to 110° C.-130° C. is counterbalanced by a decrease of a resistance of the thermistor to a current within 80% to 120% of the motor current at the nominal operational temperature, in certain applications even to a current within 95% to 110% of the motor current at the nominal operational temperature.

In again other applications the NTC thermistor is in a preferred embodiment of the invention, designed such that a drop of the motor current due to an increase of the ambient temperature to 165° C.-185° C. is counterbalanced to a current within 80% to 120% of the motor current at a nominal operational temperature, in certain applications even to a current within 95% to 110% of the motor current at a nominal operational temperature.

By providing the resistive element with one or more further components such as ohmic or temperature dependent resistors in different connection configurations it is possible to approximate a desired characteristic of the resistance of the resistive element and therefore of the motor torque, for example a substantially constant output torque of the motor over the whole operating temperature range, or even a slightly increasing torque at increasing temperatures, In general the invention may be applied in any current controlled electric motor where the motor torque has to be held more or less constant despite an increase or decrease of the ambient temperature. However, the requirements for the control unit and/or the motor in other applications may be substantially different wherefore the invention is preferably applied to HVAC actuators, i.e. actuators in the field of heating, ventilation and air conditioning.

In a preferred HVAC application, the regulating element of the actuator is a fire damper. Such fire dampers are typically arranged in a flow channel such as an air duct, ventilation tube/pipe or the like where they are used to regulate the flow of air in the channel by more or less opening or closing the channel opening. In case of a fire, it is very important that the actuator maintains its proper functionality despite an increasing ambient temperature for at least a predetermined period of time. This enables for example that smoke, fresh air, water or other fluids can be expelled from or impelled into a certain region or zone.

In a preferred embodiment of the invention the fluid flow to be regulated by the actuator is an air flow. Whereas the invention is in principle also applicable to regulate flows of liquids or any kind of gaseous fluids, the requirements for regulating such flows may be substantially different from actuators for controlling air flows.

In another preferred embodiment of the invention the actuator includes a gear mechanism. The gear mechanism is positioned between the electric motor and the regulating element and transforms the generally rotational output movement of the motor shaft of the electric motor into an appropriate movement to drive the regulating element for controlling the fluid flow.

In case of a damper or flap arranged in a flow channel and mounted on a rotatable axle that is perpendicular to the flow direction of the fluid flow, the gear mechanism transforms the rotary motion of the motor shaft into a rotary motion of the axle with a different rotational speed. Whereas the gear ratio generally can take any (physically reasonable) value, the gear mechanism is preferably designed as a reduction gear with a gear ratio below 1. The gear ratio is preferably substantially below 1, i.e. below 0.01 or even lower such that the high speed, typically low torque rotary motion of the motor shaft is transformed into a low speed, high torque rotary motion of the damper.

In some embodiments of an actuator according to the invention, the motor is used to drive the regulating element in both directions, i.e. to open and to close the flow channel. In other embodiments, the actuator preferably includes a reset element for returning the regulating element into a default position. Whereas the motor drives the regulating element in a first direction, the reset element drives it in the opposing direction. In such cases the motor may include a freewheeling clutch. In other applications, the motor is used to drive the regulating element in both directions and the reset element is used just in case of emergency such that the regulating element is returned into a specific or one of several possible default positions, for example in case of a power or motor failure.

The reset element may for example be a resilient material such as a rubber, a hydraulic or pneumatic component, one or more springs or the like. And it may be arranged such as to engage the drive path from the motor to the regulating element at the motor output, at the gear (if available), at the regulating element or anywhere in between.

The solution of another object of the invention is specified by the features of claim 14. A control unit for controlling a current provided to an electric motor of an actuator for driving a regulating element for controlling a fluid flow in a flow channel includes a resistive element positioned in a current path from the control unit to the electric motor. According to the invention said resistive element has a temperature dependent resistance.

In preferred embodiments of the invention, the actuator including the motor to be controlled with the control unit according to the invention is an actuator as described hereinbefore.

The solution of another object of the invention is specified by the features of claim 15. In a process for driving a regulating element for controlling a fluid flow in a flow channel with an electric motor by providing a current controlled by a control unit to the electric motor, a resistive element is provided in a current path from the control unit to the electric motor. According to the invention a resistive element having a temperature dependent resistance is provided in the current path from the control unit to the electric motor.

In preferred embodiments of the invention, the process according to the invention is carried out with a control unit or an actuator as described hereinbefore.

All examples and drawings described or shown above and below are not meant to be limiting the scope of the disclosure but are just meant to be illustrative embodiments of the invention.

Other advantageous embodiments and combinations of features are apparent from the detailed description below and the totality of the claims.

BRIEF DESCRIPTION OF THE DRAWINGS

The drawings used to explain the embodiments show.

In the drawings, the same components are given the same or corresponding reference symbols.

PREFERRED EMBODIMENTS

Figure 1:
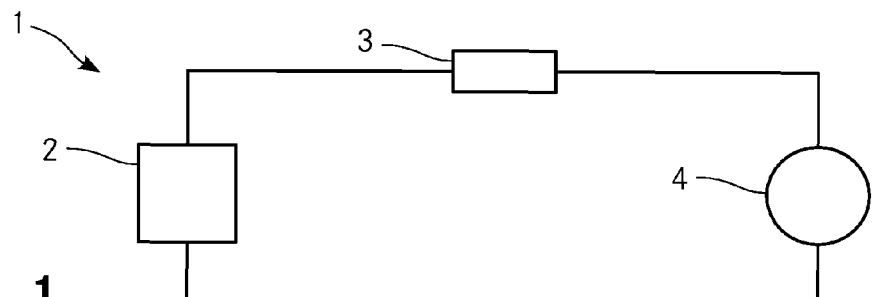
FIG. 1 shows a schematic diagram of an actuator according to the invention.

FIG. 1 shows a schematic diagram of an actuator 1 according to the invention. The actuator 1 includes a controller 2, a resistive element 3 implemented as a NTC thermistor, i.e. a thermistor with a negative temperature coefficient and an electric motor 4. Accordingly, the resistance of the resistive element 3 decreases with an increasing temperature of the thermistor.

Figure 3:
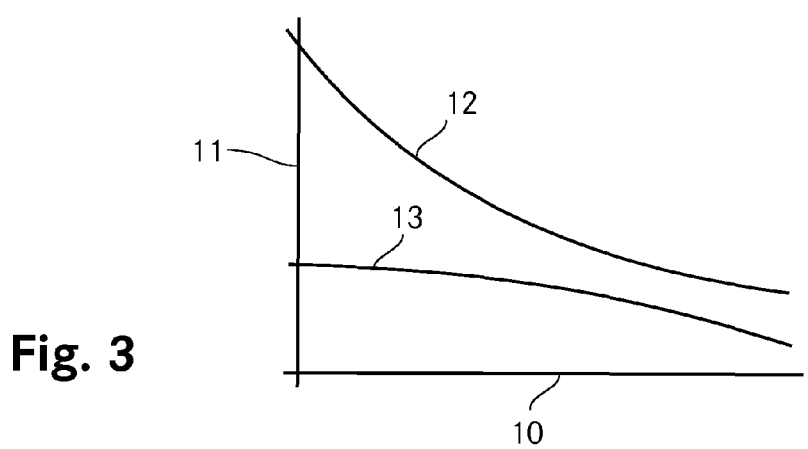
FIG. 3 shows a schematic diagram of the characteristic curve of a resistive element used in the invention and
FIG. 4 shows a schematic diagram of HVAC system with an actuator according to the invention.

FIG. 3 qualitatively shows a schematic diagram of the temperature/resistance—characteristic 12 of a NTC thermistor. The X-axis 10 represents from the left to the right an increasing temperature of the thermistor and the Y-axis 11 represents from the bottom to the top an increasing resistance of the thermistor. As sufficiently known in the art the resistance of a NTC thermistor shows an exponentially falling characteristic. The resistance $R_T$ of a thermistor at an absolute temperature T is determined according to the equation $$R_T = R_N \cdot e^{B\left(\frac{1}{T} - \frac{1}{T_N}\right)}$$

where $T_N$ is the nominal temperature of the thermistor (generally 25° C. which means 298.16 Kelvin), $R_N$ is the nominal resistance of the thermistor in ohm at the nominal temperature and where B is a material constant of the thermistor and is determined as a the ratio of the activation energy of the material and the Boltzmann constant.

Figure 2:
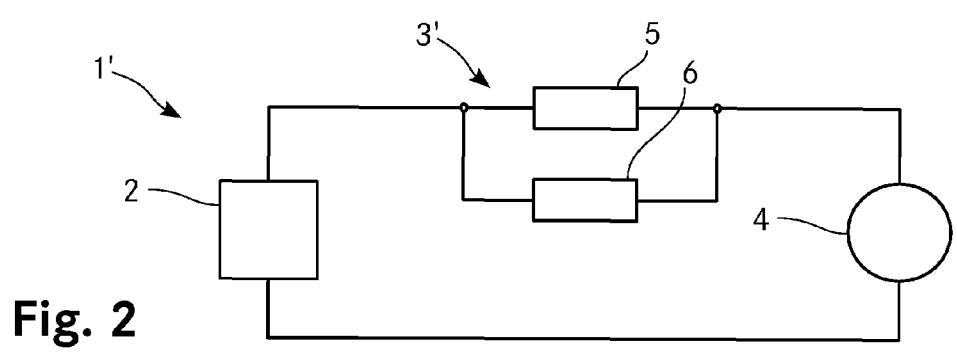
FIG. 2 shows a schematic diagram of another actuator according to the invention.

FIG. 2 shows a schematic diagram of another actuator 1' according to the invention. In this example the resistive element 3' includes a resistor 5 and a NTC thermistor 6 connected in parallel across the resistor 5. As known, with the resistor 5 having a resistance R1 and the thermistor 6 having a resistance R2 the total resistance $R_{tot}$ of the resistive element 3' is determined as follows:

$$R_{tot} = \frac{R1 \cdot R2}{R1 + R2}$$

It can easily be seen that $R_{tot}$ decreases when R2 decreases with an increasing temperature. It is sufficiently known in the art to correctly sizing and dimensioning the resistor 5 and the thermistor 6 with a given electric motor 4 and a given controller 2 in order to fulfill the requirements of a particular application. The actuator 1' is for example used in an application where the nominal operating temperature is 25° C. corresponding to the normal ambient temperature. In case of fire, the ambient temperature and therewith the temperature of the thermistor 6 increases. Accordingly, as explained hereinbefore, the resistance of the thermistor 6 decreases resulting in a current increase that counterbalances the current drop in the motor windings. Depending on the given electric motor 4 and other given components of the actuator 1' such as the controller 2, the resistor 5 and the thermistor 6 are for example sized such that, when the temperature of the thermistor 6 reaches a temperature of about 120° C., the motor current flowing through the resistive element 3' lies in a range of about 80% to 120% of the motor current at 25° C.

When dimensioning the components, the temperature dependency of the resistor 5, which may for example be an ohmic resistor, can hereby be disregarded, but may also be considered if necessary.

In an exemplary implementation of an actuator as shown in FIG. 1, the electric motor 4 is a brushed or brushless DC motor and the resistor 5 has a value of 2.8 ohm, resulting at a temperature of 25° C. in a motor current of about 72 mA (milli Ampère) delivering an output motor torque of about 0.4 mN*m (milli Newton*Meter). As the temperature increases to 120° C., the motor current decreases to a value of about 66 mA and an output motor torque of about 0.3 mNm.

According to the invention, an NTC thermistor 6 is provided in parallel across resistor 5 arriving at an actuator 1' as shown in FIG. 2. The NTC thermistor is for example a NTC-220 with a resistance of 220 ohm at room temperature decreasing to about 14 ohm at a temperature of 120° C. In this example, the resulting motor current at a temperature of 25° C. is approximately 71 mA and results in an output motor torque of about 0.4 mN*m. As the temperature increases to 120° C., the motor current increases in this case to about 85 mA and the output motor torque to about 0.43 mNm.

As mentioned above, FIG. 3 qualitatively shows the temperature/resistance—characteristic 12 of a NTC thermistor. FIG. 3 further qualitatively shows the decrease 13 of the total resistance of the resistor 5 and the thermistor 6. It can be seen that the total resistance decreases with an increasing temperature.

Figure 4:
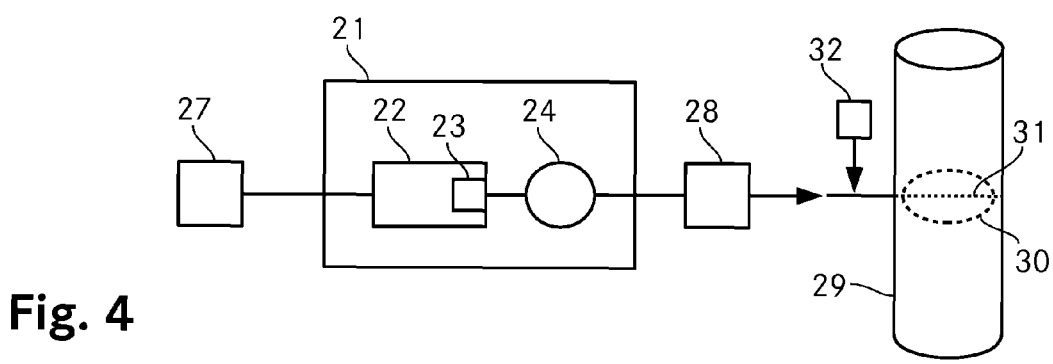

FIG. 4 shows a schematic diagram of a HVAC system with an actuator 21 according to the invention. The actuator includes a controller 22 and an electric motor 24. The resistive element 23, which for example corresponds to the resistive element 3' as shown in FIG. 2 is integrated into the controller 22. The actuator 21 is powered by a power source 27 such as for example a power supply connected to a power network. The power source may also be a battery which may or may not be rechargeable or include such a battery in case of a failure of the power network to ensure proper function of the actuator 21 for at least a certain period of time. The output motion of the electric motor 24 which typically is a rotary motion of a motor shaft is transferred by a reduction gear 28 into a rotary motion to drive the fire damper 30 that is arranged in a flow channel in the form of a tube 29 and is rotatably mounted on an axle 31. More precisely, the input of the reduction gear 28 is connected to the motor shaft and its output is connected to the axle 31 of the fire damper 30 which is penetrating a wall portion of the tube 29 where the reduction gear 28 is connected to. In the example shown, the HVAC system includes a reset element 32 which is connected to the axle 31 of the fire damper 30 such that it counteracts the rotary motion of the electric motor 4. The reset element 32 may however be connected to any portion of the drive path, i.e. at the motor output, the fire damper 30 itself or anywhere in-between.

In summary, it is to be noted that the invention provides an actuator for driving a regulating element for controlling a fluid flow in a flow channel where just a single additional component in the form of a temperature dependent resistor is sufficient to operate the actuator in a large temperature range.

The invention claimed is:

1. An actuator (1) for driving a regulating element (30) for controlling a fluid flow in a flow channel (29), of a HVAC system, wherein the actuator is able to maintain its proper functionality of regulating the fluid flow by more or less opening or closing the flow channel in exceptional situations of fire and smoke, despite a substantially increasing ambient temperature, the actuator (1) including an electric motor (4) with motor windings for driving the regulating element (30) and a control unit (2) for controlling a current provided to the motor windings (4), where a resistive element (3) is positioned in a current path from the control unit (2) to the motor windings (4), characterised in that a resistance of the resistive element (3) has a non-linear temperature dependency, particularly a substantially exponential temperature dependency.

2. The actuator according to claim 1 wherein the resistive element (3) has a negative temperature coefficient.

3. The actuator according to claim 2 wherein the resistive element includes a first resistive element (5) and a device (6) with a negative temperature coefficient connected in parallel to the first resistive element (5).

4. The actuator according to claim 3, wherein the device is a thermistor (6).

5. The actuator according to claim 4, where the thermistor (6) is designed such that a drop of the motor current due to an increase of the ambient temperature to 110° C.-130° C. is counterbalanced by a decrease of a resistance of the thermistor to a current within 80% to 120% of the motor current at a nominal operational temperature, particularly to a current within 95% to 110% of the motor current at a nominal operational temperature.

6. The actuator according to claim 5, where an increase of the ambient temperature to 165° C.-185° C. is counterbalanced to a current within 80% to 120% of the motor current at a nominal operational temperature, particularly to a current within 95% to 110% of the motor current at a nominal operational temperature.

7. The actuator according to claim 3, wherein the control unit (2) and the device (6) are part of a single electric circuit.

8. The actuator according to claim 3 wherein the first resistive element is an ohmic resistor (5).

9. The actuator according to claim 1, wherein the actuator is an actuator (1) in the field of heating, ventilation and air conditioning.

10. The actuator according to claim 1, wherein the regulating element is a fire damper (30).

11. The actuator according to claim 1, wherein the fluid flow is an air flow.

12. The actuator according to claim 1, including a gear mechanism (28) positioned between the electric motor (4) and the regulating element (30), where the gear mechanism (28) is particularly designed as a reduction gear.

13. The actuator according to claim 1, including a reset element (32) for returning the regulating element (30) into a default position.

14. A control unit for controlling a current provided to motor windings of an electric motor of an actuator according to claim 1 for driving a regulating element for controlling a fluid flow in a flow channel of a HVAC system, where the control unit includes a resistive element positioned in a current path from the control unit to the motor windings, characterised in that said resistive element has a temperature dependent resistance, allowing the actuator to maintain its proper functionality of regulating the fluid flow by more or less opening or closing the flow channel in exceptional situations of fire and smoke, despite a substantially increasing ambient temperature.

15. An actuator (1) according to claim 1, wherein the actuator is able to maintain its proper functionality of regulating the fluid flow by more or less opening or closing the flow channel in exceptional situations of fire and smoke, despite a substantially increasing ambient temperature, for a predetermined period of time, in order that fluids can be expelled from or impelled into a certain region or zone.

16. Process for driving a regulating element for controlling a fluid flow in a flow channel of a HVAC system with an electric motor with motor windings, which is able to maintain its proper functionality of regulating the fluid flow by more or less opening or closing the flow channel in exceptional situations of fire and smoke, despite a substantially increasing ambient temperature, by providing a current controlled by a control unit to the motor windings of the electric motor and providing a resistive element in a current path from the control unit to the motor windings, characterised in that a resistance of the resistive element having a temperature dependent resistance is provided in the current path from the control unit to the motor windings.

17. An actuator (1) for driving a damper (30) for controlling a fluid flow in a flow channel (29) of an HVAC system, the actuator being adapted to achieve a desired rate of the fluid flow in the flow channel in exceptional situations of fire and smoke, accompanied by substantially increasing temperature, the actuator (1) including an electric motor (4) with motor windings for driving the regulating element (30) and a control unit (2) for controlling a current provided to the motor windings (4), where a resistive element (3) is positioned in a current path from the control unit (2) to the motor windings (4), characterized in that a resistance of the resistive element (3) has a non-linear temperature dependency, particularly a substantially exponential temperature dependency.

18. The actuator according to claim 17 wherein the resistive element (3) has a negative temperature coefficient.

19. The actuator according to claim 17 wherein the resistive element includes a first resistive element (5) and a device (6) with a negative temperature coefficient connected in parallel to the first resistive element (5) and wherein the device is a thermistor (6).

20. The actuator according to claim 19, wherein the control unit (2) and the device (6) are part of a single electric circuit.

21. The actuator according to claim 19, where the thermistor (6) is designed such that a drop of the motor current due to an increase of the ambient temperature to 110° C.-130° C. is counterbalanced by a decrease of a resistance of the thermistor to a current within 80% to 120% of the motor current at a nominal operational temperature, particularly to a current within 95% to 110% of the motor current at a nominal operational temperature.

22. The actuator according to claim 21, where an increase of the ambient temperature to 165° C.-185° C. is counterbalanced to a current within 80% to 120% of the motor current at a nominal operational temperature, particularly to a current within 95% to 110% of the motor current at a nominal operational temperature.

23. The actuator according to claim 17, including a gear mechanism (28) positioned between the electric motor (4) and the regulating element (30), where the gear mechanism (28) is particularly designed as a reduction gear.

24. The actuator according to claim 17, including a reset element (32) for returning the regulating element (30) into a default position.

* * * * *